United States Patent [19]

Preston

[11] 3,900,437

[45] Aug. 19, 1975

[54] NEW METHOD FOR THE PREPARATION OF POLYAMIDE ADDUCT

[75] Inventor: Harold M. Preston, Minneapolis, Minn.

[73] Assignee: General Mills Chemicals, Inc., Minneapolis, Minn.

[22] Filed: July 1, 1974

[21] Appl. No.: 484,721

Related U.S. Application Data

[63] Continuation-in-part of Ser. No. 320,407, Jan. 2, 1973, abandoned.

[52] U.S. Cl. ........ 260/18 PN; 260/18 N; 260/404.5; 260/830 P
[51] Int. Cl. ............................................. C08 30/00
[58] Field of Search .......... 260/18 PN, 18 N, 830 P, 260/404.5

[56] References Cited
UNITED STATES PATENTS

| 2,970,971 | 2/1961 | Katz et al. | 260/18 |
| 3,291,764 | 12/1966 | Findley | 260/404.5 |
| 3,347,882 | 10/1967 | Zuppinger et al. | 260/18 |
| 3,476,684 | 9/1969 | Lane | 260/404.5 |
| 3,709,847 | 1/1973 | Toeffl et al. | 260/18 |

FOREIGN PATENTS OR APPLICATIONS

| 701,209 | 1/1965 | Canada | 260/18 |

*Primary Examiner*—Eugene C. Rzucidlo
*Attorney, Agent, or Firm*—Anthony A. Juettner; Patrick J. Span; Elizabeth Tweedy

[57] ABSTRACT

A process for making polyamide resin-epoxide adducts in a one-step operational process wherein a monoepoxide reacts with a polyamine and the product of which subsequently reacts with an acid component.

1 Claim, No Drawings

NEW METHOD FOR THE PREPARATION OF POLYAMIDE ADDUCT

This application is a continuation-in-part of my earlier application, Ser. No. 320,407, filed Jan. 2, 1973 now abandoned.

This invention relates to a process for making polyamide resin-epoxide adducts by a one-step mixing and heating procedure. More particularly, this invention relates to a process for making polyamide resin-epoxide adducts wherein an epoxide, an acid and a polyamine are combined into a mixture and caused to react.

It is known that polyamide resin-epoxide adducts can be made by first dimerizing a fatty acid, reacting the dimerized fatty acid with a polyamine to form a polyamide resin and thereafter condensing the polyamide resin with an epoxide. It is also known that unsaturated fatty acids can be condensed with epoxides and thereafter reacted with polyamines to form fluid resins having viscosities in the order of 100 centipoise.

It has now been found that polyamide resin-epoxide adducts can be made by carrying out the amine and epoxide condensation and the amidification reactions in the same operational step. An acid component, a polyamine component and a monoepoxide component can be mixed together and heated so that the condensation of the epoxide component with the amine component takes place followed by the amidification of the amine and acid components. All of the adducts thus formed readily enter into emulsions with water. They are particularly useful as curing agents for epoxy resin films.

The process of this invention comprises combining an acid component, a polyamine component and a monoepoxide component at temperatures below the boiling point of the monoepoxide and heating the mixture thereafter to a temperature and for a period of time sufficient to bring about the amidification reaction. The amidification reaction can be achieved by heating the mixture to a temperature of about 350° to 450°F. for a period of about three to eight hours. During the period at which the mixture is at substantially room temperature or during the early stages of the heating operation, the condensation reaction of the amine and epoxide components takes place. Preferably the constituents are present in the amounts of about 0.3 to 93.5 equivalent percent monoepoxide, about 2.8 to 99 equivalent percent polyamine component and about 0.5 to 89.0 equivalent percent acid component.

The acid component can be either monomeric, aliphatic unsaturated fatty monocarboxylic acids or polymeric fat acids. By selecting particular monomeric unsaturated fatty acids, dimerized fat acid or mixtures thereof, the viscosities of the resulting adducts can be varied over a wide range.

Preferably the monomeric, aliphatic, unsaturated, monocarboxylic fatty acids contain 16 to 22 carbon atoms. More preferred are the monomeric aliphatic unsaturated monocarboxylic acids containing 16 to 18 carbon atoms. Most preferred are the unsaturated monomeric aliphatic monocarboxylic acids containing 18 carbon atoms.

Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic, (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatriendic (linolenic), 6,9,12-octadecatrienoic, 9,11,13-octadecatrienoic (eleostearic), 10,12,14-octadecatrienoic (pseudoeleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentenoic (timnodonic), 13-docosenoic (erucic), 11-docosenoic (cetolic), and the like. Linoleic (9,12-octadecadienoic acid) and oleic acid (cis-9-octadecenoic acid) are readily available monomeric unsaturated aliphatic monocarboxylic acids useful in the practice of this invention. Tall oil fatty acids are naturally occurring mixtures of about 40–45% linoleic acid by weight and 50–55% oleic acid by weight and have been found to be particularly useful as the acid component in the practice of this invention. It is understood that such derivatives of the above acids which are capable of forming amides in reaction with a polyamine, such as the lower alcohol (1–8 carbon atoms) esters of polymeric fat acids may be employed in place of the acids themselves.

Polymeric fat acids are commercially available products. A description of polymeric fat acids and their method of preparation may be found in U.S. Pat. No. 3,157,681. Polymeric fat acids useful in this invention can be prepared by the heat polymerization of ethylenically unsaturated, monocarboxylic acid containing 16 to 22 carbon atoms. More preferred are the polymerization products of monomeric, ethylenically unsaturated monocarboxylic acids containing 16 to 18 carbon atoms. Most preferred are the polymerization products of monomeric unsaturated monocarboxylic acids containing 18 carbon atoms. Representative useful fat acids containing 18 carbon atoms are set out above. The polymerization can be catalyzed with clay catalysts. The polymerization will, however, proceed without the aid of a catalyst.

After polymerization with or without a catalyst, the resulting mixture contains predominantly dimeric fat acids having 32 to 44 carbon atoms, some trimeric and higher polymeric fat acids and some unpolymerized monomeric fat acids. Typical compositions of commercially available polymeric fat acids based on unsaturated $C_{18}$ fat acids are:

$C_{18}$ monocarboxylic acids 5–15 percent by weight;
$C_{36}$ dicarboxylic acids 60–80 percent by weight;
$C_{54}$ (and higher) tricarboxylic acids 10–35 percent by weight.

These mixtures may be fractionated by suitable means such as high vacuum distillation or solvent extraction techniques to obtain dimer acid cuts of higher concentration where necessary. The polymeric fat acids may also be hydrogenated (before or after fractionation) to reduce unsaturation. Hydrogenation is generally conducted under hydrogen pressure in the presence of a hydrogenation catalyst. It is also understood that such derivatives of polymeric fat acids which are capable of forming amides in reaction with a diamine, such as the lower alcohol (1–8 carbon atoms) esters of polymeric fat acids may be employed in place of the acids themselves.

The polyamines which can be used in the process of this invention have the formula:

$$H_2N-[R-NH]_xH$$

wherein R is an aromatic group containing 6 to 10 carbon atoms or an alkylene group containing 2 to 4 carbon atoms and $x$ is an integer from 1 to 5. Among the useful polyamines are xylene diamine, m-phenylene diamine, diethylene triamine, triethylene tetramine, tetraethylene pentamine and pentaethylene hexamine.

The monoepoxide component preferably includes the compounds falling within the formula:

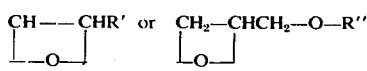

wherein R' can be a hydrogen group, phenyl group, alkyl group having 1 to 10 carbon atoms or an alkylenecarboxylate group having 2 to 22 carbon atoms and R'' can be a phenyl group or an alkyl group having from 1 to 10 carbon atoms. Included in this group are aliphatic monoepoxides such as ethylene oxide, 1,2-propylene oxide, 1,2-butylene oxide, 1,2-epoxy-3-butene, aromatic epoxides such as styrene oxide, glycidyl ethers such as butyl glycidyl ethers and phenyl glycidyl ethers and epoxy esters such as methyl epoxy stearate.

The polyamide-epoxy adducts are made by mixing the acid component, epoxy component and amine component at a temperature below the boiling point of the monoepoxide and subjecting the mixture to a controlled heating procedure. The condensation reaction between the amine and the monoepoxide takes place at lower temperatures and over shorter time periods than the amidification reaction involving the polyamine and acid components. Therefore, during the early stages of the heating procedure the epoxide associates with the polyamine component. Considering only the condensation reaction, an epoxide containing a terminal oxirane group such as in butyl glycidyl epoxide can completely react with the amine component in about one hour at room temperature. The reaction requires a longer period of time when the oxirane group is in a secondary position in an aliphatic carbon chain. Similarly, aliphatic carbon chain oxirane groups are less reactive than aromatic oxirane groups and may even require heating to complete the reaction. When using fairly high molecular weight monoepoxides, the components may be merely combined and heating commenced. The condensation reaction will thereupon take place without further procedural steps. The temperature and the time period at which the condensation reaction will proceed become important when low molecular weight monoepoxides are used. Monoepoxide components containing from two to four carbon atoms are relatively volatile and, unless precautions are taken, may be driven off by high temperatures before condensation can occur. When monoepoxide components containing from two to four carbon atoms are used, the reaction can be conducted under pressure with no adjustment in the rate of heating. Alternatively, the monoepoxide component can be mixed with the amine component or a mixture of the polyamine component and the acid component at temperatures below the boiling points of the monoepoxide and allowed to associate or condense with the polyamine component prior to raising the temperature of the mixture to amidifying temperatures.

As indicated above, these adducts can be reacted with epoxy resin to form a thermosetting material. The final cured product possesses good heat resistance, hardness and flexural strength. The epoxy resins which may be employed are complex polymeric reaction products of polyhydric, mono- and polynuclear phenols with polyfunctional halohydrins and/or glyerol dichlorohydrin. A large number of epoxy resins of this type are disclosed in Greenlee U.S. Pat. Nos. 2,585,115 and 2,589,245. In addition several of these resins are readily available commercial products. Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis (p-hydroxy phenol)propane (Bisphenol A), the resin having the following theoretical structural formula

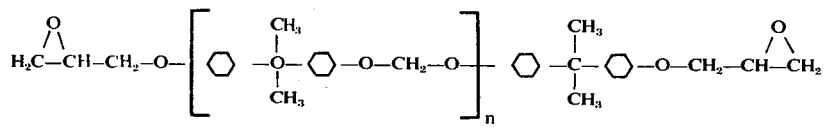

where $n$ is 0 or an integer up to 3 and preferably 1 or less.

Epoxy resins may be characterized further by reference to their epoxy equivalent weight, the epoxy equivalent weight of pure epoxy resins being the molecular weight of the resin divided by the mean number of epoxy radicals per molecule or in any case the number of grams of one gram equivalent of epoxide. While certain specific epoxy resins which are the most readily available have been described, It is understood that the epoxy resinous compositions encompassed by this invention are those epoxy resins having an epoxy equivalent weight of 140 to 600, the preferred epoxy equivalent weight being 170 to 600, expressed in terms of grams of compounds per epoxy group.

Another type of epoxide resins which can be cured using the adducts of this invention are mixtures of glycidyl polyethers of dihydric phenols and glycidyl esters of dimerized unsaturated fatty acids. Mixtures of this type are described in U.S. Pat. No. 3,057,809.

EXAMPLE I

This example illustrates the preparation of a polyamide-epoxide adduct using monomeric, aliphatic, unsaturated fatty acids as the acid component.

The following constituents are combined in a reaction vessel:

| | |
|---|---|
| Tall oil fatty acids* | 25.1 parts by weight (7.63 equivalent percent) |
| Methyl epoxy stearate | 40.3 parts by weight (81.30 equivalent percent) |
| Tetraethylene pentamine | 34.6 parts by weight (11.07 equivalent percent) |

*Approximately 40 to 45% linoleic acid by weight and 50 to 55% oleic acid by weight.

The mixture was heated at a temperature of 350°F. for a period of three hours. The resulting polyamide-epoxy adduct exhibited the following properties:

> Amine number = 350*
> Acid value = 2.6**
> Viscosity = 4500 poise***

* The amine number is defined as the milligrams of potassium hydroxide equivalent to the amine alkalinity present in a one gram sample.
**The acid value is defined as the number of milligrams of potassium hydroxide neutralized by the free acids present in one gram of polyamide.
***Measured with a Brookfield Viscometer equipped with a No. 7 spindle rotating at 4 rpm at a temperature of 72°F.

EXAMPLE II

This example illustrates the preparation of a polyamide-epoxide adduct using polymeric fat acid as the acid component.

The following constituents were combined in a reaction kettle:

|  | Percentage by weight | Equivalent percentage |
|---|---|---|
| Polymeric fat acid* | 50.0 | 15.564 |
| Triethylene tetramine | 29.8 | 67.550 |
| Butyl glycidyl ether | 16.4 | 11.111 |
| Propylene oxide | 3.8 | 5.776 |

*The polymeric fat acid was derived from the polymerization of tall oil fatty acid wherein 40 to 45% by weight was linoleic acid and 50 to 55% by weight was oleic acid.

The propylene oxide was combined with 39% by weight of the triethylene tetramine and allowed to react with the amine prior to being combined with the other ingredients.

The above mixture was gradually heated over a period of eight hours to a maximum temperature of 400°F. The resulting mixture had an amine value of 359.4, an acid value of 1.9 and viscosity as measured with a Brookfield Viscometer equipped with a No. 7 spindle rotating at 4 rpm at a temperature of 72°F. of 19,120.0 centipoise.

The polyamide-epoxide adduct was mixed with water emulsions of epoxy coating material. The epoxy coating material had the composition of about 79.4 percent of a substantially pure, liquid Bisphenol A type epoxy resin (Epoxide Equivalent weight 187 to 191), about 14.0 percent of an epoxy alkane containing 12 to 14 carbon atoms sold under the tradename Epoxide No. 8 by Procter & Gamble Co., and 0.6% of 2-amino-2-methyl-1-propanol and about 6.0% polyoxyethylene sorbitan monolaurate sold under the tradename Tween 20 by the Atlas Co. The mixed coating was brushed onto a standard Leneta coating test substrate. The resulting even, smooth wet film was cured at room temperature overnight to a hard, tough, adherent film, exhibiting excellent gloss. After a two-week period the coating was wetted with methyl isobutyl ketone. No loss of gloss was caused by the exposure to the solvent.

EXAMPLE III

This example illustrates the use of various epoxides in the present process. Using the procedure set out in Example II except that the heating was conducted for six hours, the following compositions were made:

Table 1

| Sample No. | 1 | 2 | 3 | 4 | 5 |
|---|---|---|---|---|---|
| Constituents | | | Equivalents | | |
| Polymeric fat acid | 1.0 | 1.0 | 1.0 | 1.0 | 1.0 |
| Triethylene tetramine | 4.0 | 4.0 | 4.0 | 4.0 | 4.0 |
| Propylene oxide | 0.5 | 0.5 | 0.5 | 0.5 | 0.5 |
| Styrene oxide | 0.0418 | 1.7545 | — | — | — |
| Butyl glycidyl oxide | — | — | 0.681 | — | — |
| Propyl glycidyl oxide | — | — | — | 0.546 | — |
| Epoxy alkane containing 10 to 12 carbon atoms (EPOX No. 7, Procter & Gamble Co.) | — | — | — | — | 0.410 |
| | | | Characteristics | | |
| Amine Value | 415.2 | 256.3 | 359.4 | 257.9 | 339.4 |
| Acid number | 1.2 | 1.1 | 1.9 | 1.3 | 8.2 |
| Viscosity*, centipoise | 115.0 | 16000.0 | 191.2 | 432.5 | 217.5 |

*Brookfield Viscometer equipped with a No. 7 spindle rotating at 4 rpm at a temperature of 72°F.

EXAMPLE IV

This example illustrates the use of various amines in the process using the procedure set out in Example III. The compositions are shown in Table 2:

Table 2

| Sample No. | 1 | 2 | 3 | 4 | | 6 | 7 |
|---|---|---|---|---|---|---|---|
| Constituents | | | | Equivalents | | | |
| Polymeric fat acid | 1.0 | 1.0 | 1.0 | 1.0 | 1.0 | 1.0 | 1.0 |
| Triethylene tetramine | 1.0 | 1.0 | 1.0 | 1.0 | 3.0 | 1.0 | 1.0 |
| Propylene oxide | 0.5 | 0.5 | 0.5 | 0.5 | 1.5 | 0.5 | 0.5 |
| Styrene oxide | 0.78 | 0.78 | 0.78 | 0.78 | 0.78 | 0.78 | 0.78 |
| Diethylene triamine | 3.00 | — | — | — | — | — | — |
| Tetraethylene pentamine | — | 3.00 | — | — | — | — | — |
| Pentaethylene hexamine | — | — | 3.00 | — | — | — | — |

Table 2 — Continued

| | | | | | | | |
|---|---|---|---|---|---|---|---|
| Bis-(hexamethylene triamine) (sold by DuPont under the tradename Amine 248) | — | — | — | 3.00 | — | — | — |
| Xylene diamine | — | — | — | — | — | 3.00 | — |
| m-Phenylene diamine | — | — | — | — | — | — | 3.00 |
| | | | | Characteristics | | | |
| Amine value | 359.0 | 344.9 | 316.3 | 246.3 | 348.5 | 297.5 | * |
| Acid number | 1.2 | 1.3 | 1.1 | 1.4 | 1.0 | 1.3 | * |
| Viscosity, centipoise ** | 237.5 | 3375.0 | 11600.0 | 775.0 | 3435.0 | 205.0 | * |

\* Not measured
\*\* Brookfield Viscometer equipped with No. 7 spindle rotating at 4 rpm at 72°F.

EXAMPLE V

This example illustrates typical concentrations of components which can be used in the process of this invention. Shown below in Table 3 are combinations of constituents in varying proportions. The acid component was a polymeric fat acid obtained by the dimerization of tall oil fatty acids. The epoxide component was styrene oxide and propylene oxide. The amine component was triethylene tetramine. The propylene oxide was incorporated into the triethylene tetramine prior to the reaction of the amine with the epoxide component and the polymeric fat acid.

The polyamide-epoxide adduct was made by combining the styrene oxide, triethylene tetramine, triethylene tetramine containing propylene oxide, into the reaction vessel, stirring the mixture for about an hour before heat was applied, then gradually heating the mixture to a temperature of 400°F. and holding the mixture at that temperature for six hours.

-Continued

| | Percent By Weight |
|---|---|
| Nonylphenoxy poly(ethyleneoxy) ethanol having 89% by weight ethyleneoxy | 0.7 |
| Nonylphenoxy poly(ethyleneoxy) ethanol having 44% by weight (ethyleneoxy) | 0.4 |

The epoxy resin used with Samples A and C through G had the following formulation:

| | Percent By Weight |
|---|---|
| Substantially pure, liquid Bisphenol A type epoxy resin (Epoxide equivalent 187 to 191) | 80.7 |
| Mixture of epoxy alkanes containing 12 to 14 carbon atoms (Epoxide 8 sold by Procter & Gamble Co.) | 14.4 |
| Polyoxyethylene sorbitan mono laurate (Tween 20 sold by Atlas Corp.) | 4.9 |

Table 3

| | Epoxide Component | | | | Amine Component | | Acid Component | | | |
|---|---|---|---|---|---|---|---|---|---|---|
| | Styrene Oxide | | Propylene Oxide | | Triethylene Tetramine | | Polymeric Fat Acid | | Amine | Viscosity |
| Sample | Wt. % | Eq. % | Wt. % | Eq. % | Wt. % | Eq. % | Wt. % | Eq. % | Value | poise |
| A | 18 | 13.8 | 15.0 | 24.0 | 18.0 | 46.5 | 49 | 15.6 | 200.0 | 45 |
| B | 1 | 0.7 | 17.5 | 25.9 | 23.5 | 55.9 | 58 | 17.9 | 415.0 | 115 |
| C | 60 | 54.4 | 5.0 | 9.3 | 9.0 | 27.1 | 24 | 9.2 | 156.3 | semi-solid |
| D | 30 | 14.1 | 29.5 | 28.6 | 35.5 | 56.3 | 5 | 1.0 | 774.7 | 37 |
| E | 60 | 38.0 | 16.0 | 20.7 | 19.0 | 40.0 | 5 | 1.3 | 202.2 | solid |
| F | 5 | 2.1 | 39.5 | 31.5 | 49.5 | 65.6 | 5 | 0.8 | 1076.5 | 2 |
| G | 5 | 4.8 | 11.0 | 21.9 | 13.0 | 41.2 | 71 | 32.1 | 139.0 | >5000 |

EXAMPLE VI

This example illustrates the effectiveness of the polyamide-epoxide adducts shown in Example III as curing agents for epoxy resins. The particular adducts and epoxy resins combined are shown in Table 4. The epoxy resin used with Sample B had the following formulation:

| | Percent By Weight |
|---|---|
| Substantially pure, liquid Bisphenol A type epoxy resin (Epoxide equivalent 187 to 191) | 72.9 |
| Mixture of a diglycidyl ether of Bisphenol, epoxide equivalent 200, and a glycidyl ester of dimerized fatty acid, epoxide equivalent 435, (Epon 72, Shell Oil) | 24.9 |

A water-epoxy resin emulsion was made by mechanically mixing the epoxy resin into the water with mechanical stirring. The epoxy resin content of the emulsion was 50% by weight. The polyamide epoxide adduct was hand stirred into the epoxy resin-water emulsion. The resulting mixture was brushed onto a standard Leneta Coating test substrate and allowed to cure overnight. The results of the curing epoxy resin are shown in Table 4.

Table 4

| Adduct Sample Number | Epoxy Resin, grams | Adduct, grams | Condition of Final Film |
|---|---|---|---|
| A | 19.1 | 27.0 | Tough, hard and |

Table 4-Continued

| Adduct Sample Number | Epoxy Resin, grams | Adduct, grams | Condition of Final Film |
|---|---|---|---|
| B | 17.0 | 21.0 | smooth Tough, hard and smooth |
| C | 20.0 | 36.0 | Hexane solvent resistant |
| D | 200.0 | 72.5 | Tough, hard and smooth |
| E | 20.0 | 28.0 | Hard and hexane solvent resistant |
| F | 200.0 | 52.5 | Tough, hard and methyl isobutyl ketone solvent resistant |
| G | 20.0 | 40.6 | Flexible and hexane solvent resistant |

The embodiments of the invention in which an exclusive property or privilege is claimed are defined as follows:

1. A process comprising: heating a mixture of
   a. an amine component having the formula

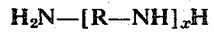

wherein R is an aromatic group containing 6 to 10 carbon atoms or an alkylene containing 2 to 4 carbon atoms and $x$ is an integer from 1 to 5,
   b. a monoepoxide component selected from monoepoxides having the formula

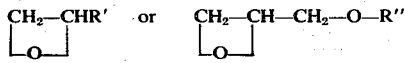

wherein R' is a hydrogen group, phenyl group, alkyl group having from 1 to 10 carbon atoms, or an alkylene carboxylate group having 2 to 22 carbon atoms and R'' is a phenyl group or an alkyl group having from 1 to 10 carbon atoms, and
   c. an acid component selected from monomeric, aliphatic, unsaturated monocarboxylic fatty acids containing 16 to 22 carbon atoms or polymeric fat acids predominantly containing 32 to 44 carbon atoms;

wherein said mixture comprises about 0.3 to 93.5 equivalent percent epoxide component, about 2.8 to 99 equivalent percent amine component and about 0.5 to 89.0 equivalent percent acid component;

said heating increasing the temperature of the above mixture from a temperature below the boiling point of the epoxide component to a temperature of about 350°F. to 450°F. and conducted so that the temperature of the above mixture is held below the boiling point of the epoxide component, the boiling point of said epoxide component being adjusted in the mixture by adjusting the pressure under which the reaction is conducted, for a period of time sufficient to permit association of the monoepoxide component and the amine component prior to heating to the temperature of about 350°F. to 450°F. and holding at that temperature for a time period of about three to eight hours until the amidification reaction takes place thereby forming a polyamide resin-epoxide adduct wherein the amine component is condensed with the monoepoxide.

* * * * *